(12) United States Patent
Aung (10) Patent No.: US 7,830,276 B2
(45) Date of Patent: Nov. 9, 2010

(54) SYSTEM AND METHOD FOR DISPLAYING REQUIRED NAVIGATIONAL PERFORMANCE CORRIDOR ON AIRCRAFT MAP DISPLAY

(75) Inventor: Yan L. Aung, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 425 days.

(21) Appl. No.: 11/764,510

(22) Filed: Jun. 18, 2007

(65) Prior Publication Data

US 2008/0309518 A1    Dec. 18, 2008

(51) Int. Cl.
G08B 21/00 (2006.01)
B60Q 1/00 (2006.01)
G08G 1/123 (2006.01)
G05D 1/00 (2006.01)
G06F 19/00 (2006.01)

(52) U.S. Cl. .......... 340/995.26; 340/435; 340/438; 340/945; 340/955; 340/963; 340/973; 340/975; 340/979; 340/980; 340/995.27; 701/8; 701/9; 701/15; 701/16

(58) Field of Classification Search .......... 340/945, 340/955, 963, 964, 973, 975, 979, 980, 995.27, 340/435, 438; 701/8, 9, 15, 16
See application file for complete search history.

(56) References Cited

U.S. PATENT DOCUMENTS

| | | | | |
|---|---|---|---|---|
| 5,289,185 A * | 2/1994 | Ramier et al. | | 340/971 |
| 5,798,713 A * | 8/1998 | Viebahn et al. | | 340/974 |
| 6,571,155 B2 * | 5/2003 | Carriker et al. | | 701/3 |
| 6,798,423 B2 * | 9/2004 | Wilkins et al. | | 345/618 |
| 6,812,858 B2 * | 11/2004 | Griffin, III | | 340/945 |
| 6,885,313 B2 | 4/2005 | Selk, II et al. | | |
| 6,995,690 B1 * | 2/2006 | Chen et al. | | 340/974 |
| 7,256,710 B2 * | 8/2007 | Mumaw et al. | | 340/973 |
| 7,650,232 B1 * | 1/2010 | Paielli | | 701/205 |
| 2003/0004619 A1 | 1/2003 | Carriker et al. | | |
| 2005/0182528 A1 | 8/2005 | Dwyer et al. | | |
| 2008/0140270 A1 * | 6/2008 | Davis et al. | | 701/8 |
| 2009/0024261 A1 | 1/2009 | Rouquette et al. | | |

OTHER PUBLICATIONS

European Patent Office "European Search Report," mailed Apr. 23, 2010 for Application No. 08158286.8-2215.

* cited by examiner

*Primary Examiner*—Benjamin C Lee
*Assistant Examiner*—Lam P Pham
(74) *Attorney, Agent, or Firm*—Ingrassia Fisher & Lorenz, P.C.

(57) ABSTRACT

A method is provided for indicating the boundaries of a required navigational performance (RNP) corridor on an aircraft's map display. The method includes the steps of producing an aircraft leg segment symbol on the map display, establishing an RNP value, and scaling the RNP value to the map display field of view. The method further includes the step of generating an RNP corridor boundary graphic on the map display offset from the aircraft leg segment symbol by the scaled RNP value.

19 Claims, 6 Drawing Sheets

SYSTEM AND METHOD FOR DISPLAYING REQUIRED NAVIGATIONAL PERFORMANCE CORRIDOR ON AIRCRAFT MAP DISPLAY

FIELD OF THE INVENTION

The present invention relates generally to vehicular display systems, and, more particularly, to an aircraft display system and method for indicating the boundaries of a required navigational performance corridor on an aircraft's navigational map display.

BACKGROUND OF THE INVENTION

The Federal Aviation Administration has developed required navigation performance (RNP) protocols to facilitate the management of air traffic. Under these protocols, RNP values (e.g., 0.1 to 30 nautical miles) may be assigned to various particular segments, or legs, of an aircraft's flight plan. For example, when an aircraft approaches an airfield, the aircraft may be assigned a particular flight plan segment, or landing leg, by the air traffic controller. Depending upon air traffic, the air traffic controller may also communicate to the aircraft's crew (e.g., pilot) an RNP value associated with the landing leg (e.g., 2.0 nautical miles). The RNP value defines an airspace within which the aircraft should remain for a predetermined percentage (e.g., 95 percent) of the total flying time. This airspace may be referred to as the RNP Obstacle Evaluation Area or, more simply, the RNP corridor. If the aircraft is RNP capable and if the pilot is appropriately certified, the pilot may attempt to travel the assigned landing leg while remaining within the RNP corridor. If, during the landing attempt, the aircraft breaches an RNP boundary and the leaves the corridor, a warning indicator (e.g., a hazard light) is produced inside the aircraft's cabin and the landing may be aborted and attempted again at a later time.

Many conventional aircraft display systems do not provide a visual indication of the location of the RNP corridor boundaries relative to the aircraft's position and projected flight path. Such conventional aircraft display systems do not graphically indicate whether, under the current flight parameters (e.g., aircraft speed, bank angle, pitch, yaw, wind sheer, etc.), the aircraft will travel outside of the RNP corridor. Consequently, the flight crew may need to interpret data from various aircraft systems to estimate the location of the RNP corridor boundaries. This can increase the flight crew's overall workload. In addition, this may deter the pilot from taking corrective actions to maintain the aircraft within the RNP corridor. As a result, the likelihood of an RNP corridor containment breach and, thus, an aborted landing, is increased.

It is thus desirable to provide an aircraft display system and method for graphically indicating the boundaries of an RNP corridor on a display (e.g., a navigational map display) in an intuitive manner. In addition, it would be desirable for the RNP corridor to be scalable to the field of view of the map display to thereby permit the pilot (or other crew member) to view the aircraft flight plan and projected flight path relative to the RNP corridor in a desired level of detail. Finally, it would be desirable if the aircraft display system were configured to generate an alert if the aircraft is currently outside of the RNP corridor or is projected to breach an RNP corridor boundary. Other desirable features and characteristics of the present invention will become apparent from the subsequent detailed description of the invention and the appended claims, taken in conjunction with the accompanying drawings and this background of the invention.

BRIEF SUMMARY OF THE INVENTION

A method is provided for indicating the boundaries of a required navigational performance (RNP) corridor on an aircraft's map display. The method includes the steps of producing an aircraft leg segment symbol on the map display, establishing an RNP value, and scaling the RNP value to the map display field of view. The method further includes the step of generating an RNP corridor boundary graphic on the map display offset from the aircraft leg segment symbol by the scaled RNP value.

A program product is also provided that includes an avionics display program and computer-readable media bearing the avionics display program. The avionics display program is adapted to generate a map display having a field of view (FOV) and including a leg segment symbol. The display program establishes an RNP value, scales the RNP value to the map display FOV, and produces an RNP corridor boundary graphic on the map display separated from the leg segment symbol the scaled RNP value.

Lastly, an aircraft display system is provided, which includes a monitor, at least one data source, and a processor coupled to the monitor and the at least one data source. The processor is configured to generate on the monitor a map display including a leg segment symbol and RNP corridor boundary graphics. The RNP corridor boundary graphics are separated from the leg segment symbol by a gap corresponding to the RNP value scaled to map display field of view.

BRIEF DESCRIPTION OF THE DRAWINGS

The present invention will hereinafter be described in conjunction with the following drawing figures, wherein like numerals denote like elements, and.

DETAILED DESCRIPTION OF AT LEAST ONE EXEMPLARY EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
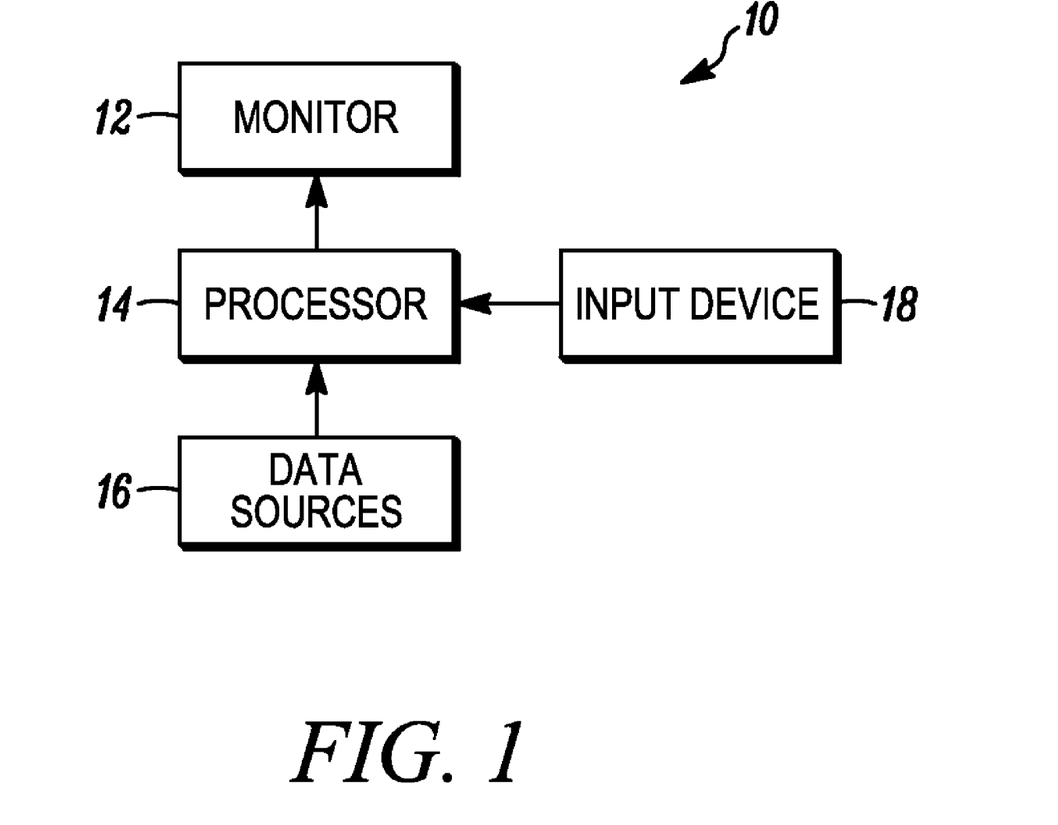
FIG. 1 is a block diagram of a generalized avionics display system in accordance with a first exemplary embodiment of the present invention.

FIG. 1 is a functional block diagram of a generalized avionics display system 10. Display system 10 is required navigational performance (RNP) capable. That is, display system is capable of monitoring aircraft position with the degree of accuracy required under RNP protocols established by the Federal Aviation Administration. Display system 10 includes at least one monitor 12, a processor 14, and a plurality of data sources 16. In certain embodiments, display system 10 may also include a user input 18, such as a keyboard and/or a cursor control device (e.g., a trackball). Processor 14 includes at least first and second inputs, which are operatively coupled to data sources 16 and input device 18, respectively. Processor 14 further includes at least one output, which is operatively coupled to monitor 12. Monitor 12 may comprise any suitable image-generating device including various analog devices (e.g., cathode ray tube) and digital devices (e.g., liquid crystal, active matrix, plasma, etc.). In one option, monitor 12 is a head-up display. Processor 14 may comprise, or be associated with, any suitable number of individual microprocessors, flight control computers, navigational equipment, memories, power supplies, storage devices, interface cards, and other standard components known in the art. In this respect, the processor 14 may include or cooperate with any number of software programs (e.g., avionics display programs) or instructions designed to carry out the various methods, process tasks, calculations, and control/display functions described below.

Data sources 16 provide static and/or real-time information to processor 14, which processor 14 utilizes to generate one or more displays on monitor 12, such as a navigational map display. Data sources 16 may include a wide variety of informational systems, which may reside onboard the aircraft or at a remote location. By way of example, data sources 16 may include one or more of the following systems: a runaway awareness and advisory system, an instrument landing system, a flight director system, a weather data system, a terrain avoidance and warning system, a traffic and collision avoidance system, a terrain database, an initial reference system, and a navigational database. Data sources 16 may also include mode, position, and/or detection elements (e.g., gyroscopes, global positioning systems, inertial reference systems, etc.) capable of determining the mode and/or position of the aircraft relative to one or more reference locations, points, planes, or navigation aids.

Figure 2:
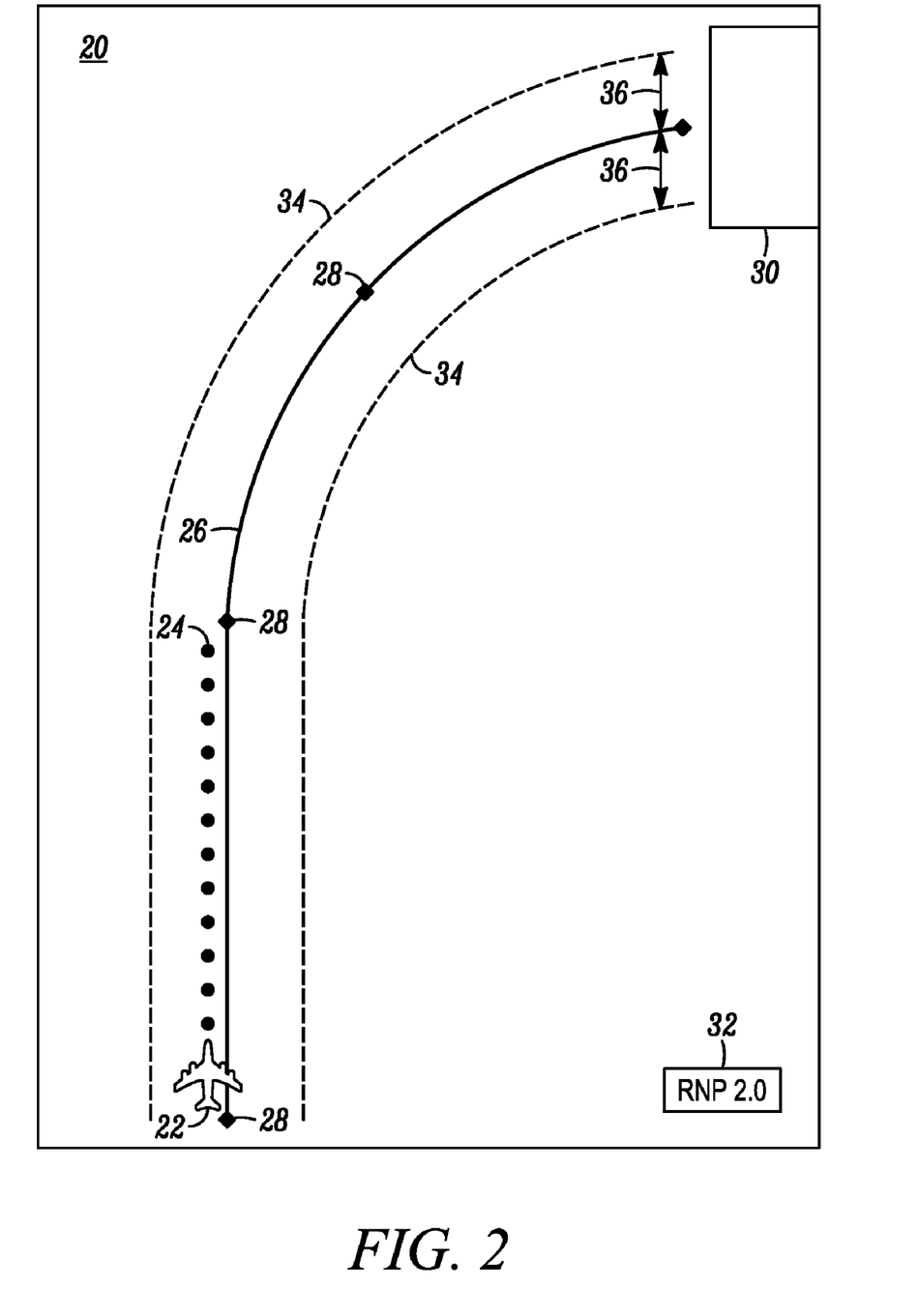
FIGS. 2 and 3 illustrate a navigational map display having first and second fields of view, respectively, that may be generated by the display system shown in FIG. 1.

FIG. 2 illustrates an exemplary navigational map display 20 that processor 14 may produce on monitor 12. Map display 20 provides a two dimensional, top down view of the aircraft's position, projected flight path, flight plan, and surrounding environment. Although the particular symbology may vary from system to system, an aircraft symbol 22 may be utilized to denote the aircraft's position, a dotted line 24 may be utilized to denote the aircraft's projected flight path, and a solid line 26 connecting way point symbols 28 may be utilized to denote a leg segment of the aircraft's flight plan. In the illustrated exemplary embodiment, solid line 26 represents a landing leg, which terminates at a designated runway as indicated by runway graphic 30. Various other symbols may also be displayed on navigational map display 20 in addition to those shown in FIG. 2, including, for example, symbols denoting terrain (e.g., mountains), weather, political boundaries, and other information useful in the piloting of an aircraft.

A particular RNP value, typically ranging from 0.1 to 30 nautical miles, may be assigned to the leg of the aircraft's flight plan shown in FIG. 2. For the pilot's reference, this RNP value (e.g., 2.0 nautical miles) may be graphically indicated on map display 20; e.g., expressed within a text box 32. As explained above, the RNP value defines an airspace commonly referred to as the RNP corridor. Processor 14 is configured to produce at least one graphic on navigational map display 20 indicative of the lateral boundaries of the RNP corridor. For example, the lateral boundaries of the RNP corridor may be represented by first and second dashed lines 34. Each dashed line 34 is offset from the projected flight path symbol (solid line 26) by a gap 36 having a width corresponding to the current RNP value; e.g., with reference to FIG. 2, each gap 36 may have a width corresponding to an RNP value of 2.0 nautical miles.

Figure 3:
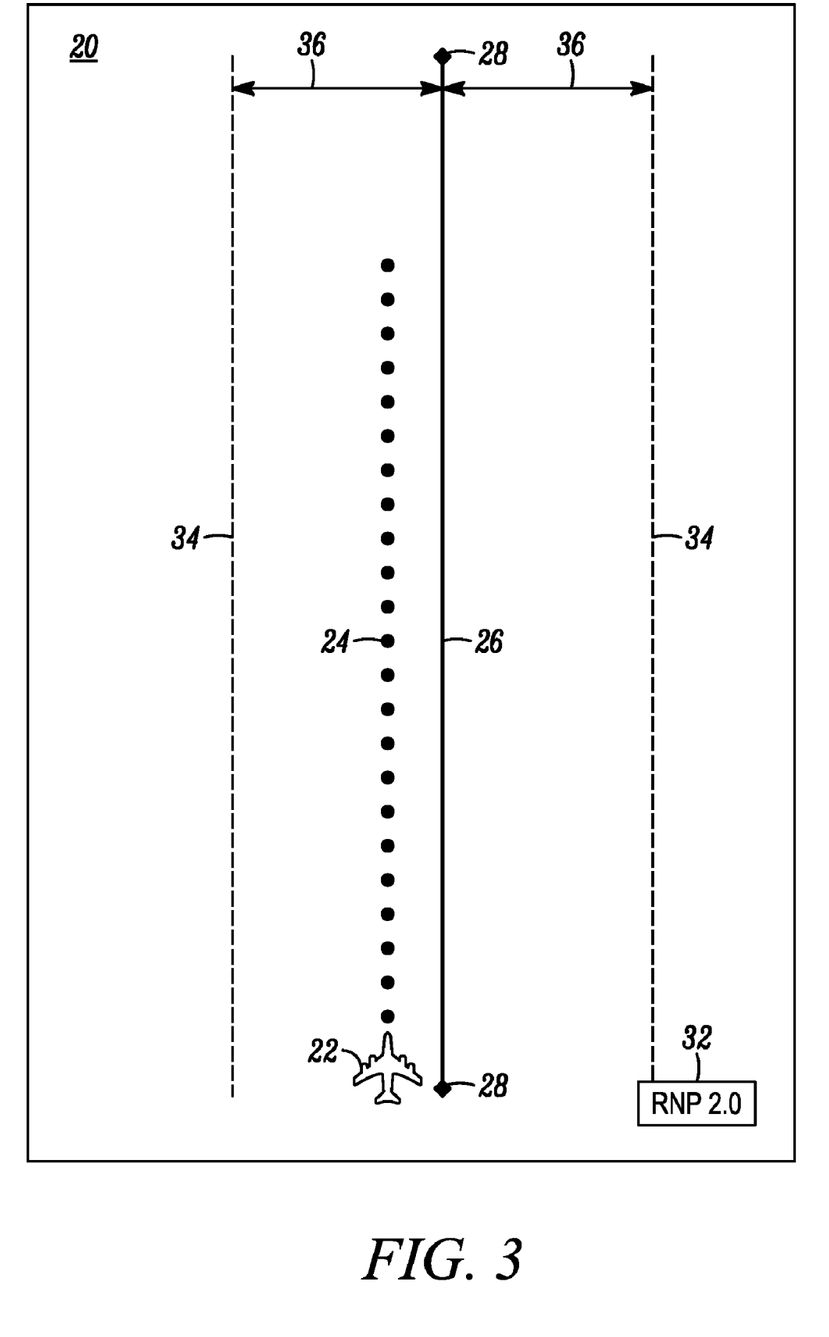

Navigational map display 20 has a predetermined field of view (FOV), which may be, for example, 20 nautical miles (width) by 30 nautical miles (height). The FOV of navigational map display 20 is variable and may be adjusted as desired. For example, if more precise maneuvering of the aircraft is required, the FOV of the map display may be decreased to zoom in on the aircraft symbol, the projected flight path symbol, and the leg segment symbol. Conversely, if precise maneuvering is not required, the FOV of the map display may be increased to zoom out and thereby provide the pilot with greater situational awareness of the aircraft's surroundings. As the FOV of map display 20 is adjusted in this manner, the width of each gap 36 will increase or decrease accordingly. This point is further illustrated in FIG. 3, which shows map display 20 having a more focused field of view; e.g., 10 nautical miles (width) by 15 nautical miles (height). As can be seen, the width of gap 36 has increased in proportion to the decrease in FOV. As a result, map display 20 provides the pilot with a more detailed view of the aircraft's flight plan (solid line 26) and projected flight path (dotted line 24) with respect to the RNP corridor boundaries (dashed lines 34).

In view of the foregoing description, it should be appreciated that the offset or separation between corridor boundary graphics (dashed lines 34) and the projected flight path symbol (solid line 26) corresponds to the RNP value scaled to the FOV of navigational map display 20. Thus, as the FOV of map display 20 changes, processor 14 will alter offset between the leg segment symbol (solid line 26) and the corridor boundary graphics (dashed lines 34) accordingly. Similarly, if the RNP value is changed (e.g., if the pilot enters a new RNP value utilizing input device 18), processor 14 will adjust the offset between the leg segment symbol (solid line 26) and the corridor boundary graphics (dashed lines 34) to correspond to the new RNP value.

Figure 4:
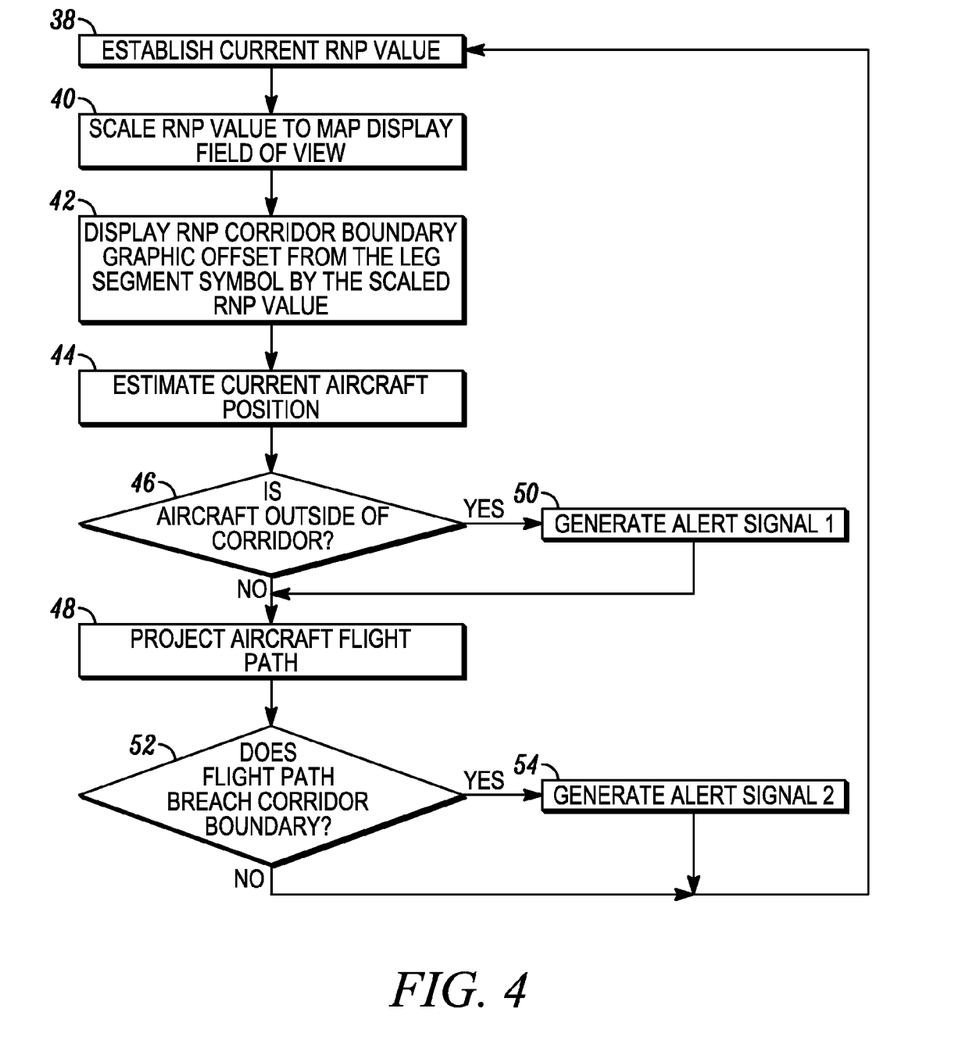
FIG. 4 is a flowchart illustrating an exemplary process that may be carried out by the display system of FIG. 1.

FIG. 4 is a flowchart illustrating an exemplary process that may be carried out by processor 14 in generating a graphic indicative of the lateral boundaries of the RNP corridor on navigational map display 20. By executing the exemplary process shown in FIG. 4, processor 14 may also be configured to generate an alert signal if an alert condition is detected. For example, processor 14 may generate an alert signal if either: (1) the aircraft's current position resides outside of the RNP corridor, or (2) the aircraft's projected flight path is projected to breach an RNP corridor boundary. The alert signal may comprise a visual, audible, and/or haptic alarm of any suitable type; however, the alert signal preferably comprises a visual change to map display 20 (e.g., an alteration in color of one or more graphics displayed on display 20) so as to provide the crew members with an intuitive head-up alert of the condition.

The exemplary process of FIG. 4 commences as processor 14 establishes the RNP value associated with the current leg of the flight plan (STEP 38). The RNP value may be supplied by a crew member (e.g., the pilot) utilizing input device 18 (FIG. 1). Alternatively, the RNP value may be recalled from a memory associated with processor 14 or wirelessly communicated to processor 14 by the air traffic controller. Processor 14 then scales the RNP value to the current FOV of navigational map display 20 (STEP 40), and generates RNP corridor boundary graphics (e.g., dashed lines 34) on display 20 (STEP 42). The RNP corridor boundary graphics are offset from the aircraft leg segment symbol (e.g., solid line 26) by the scaled RNP value as explained above in conjunction with FIGS. 2 and 3.

Figure 5:
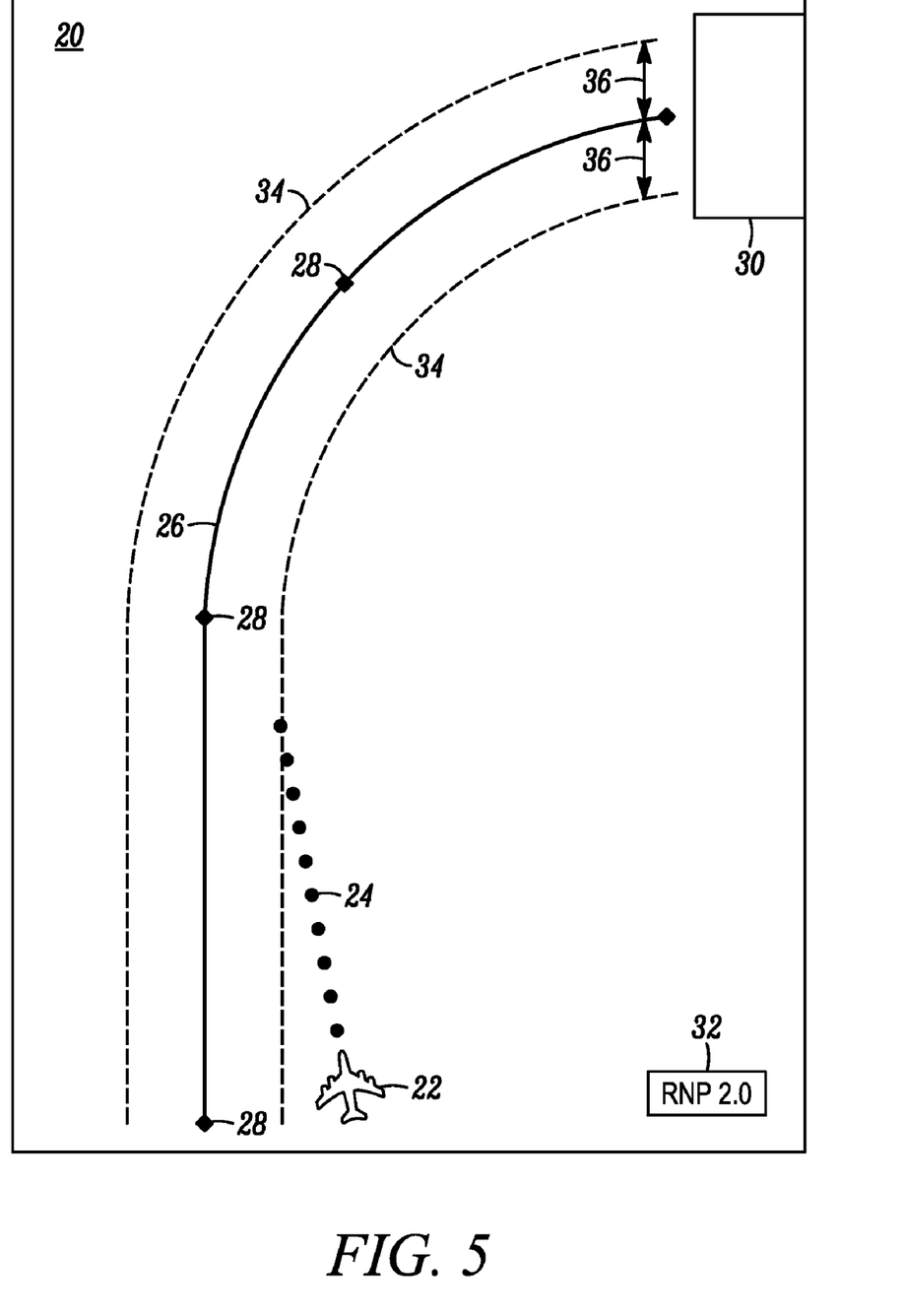
FIGS. 5 and 6 illustrate the navigational map display shown in FIG. 2 showing first and second alert conditions, respectively.

After generating the RNP corridor boundary graphics on map display 20, processor 14 next determines whether an alert condition is detected and, consequently, whether an alert signal should be generated. To this end, processor 14 may first estimate the current position of the aircraft (STEP 44). Processor 14 compares the estimated position of the aircraft to the location of the RNP corridor boundaries to determine whether the aircraft's position resides outside of the corridor (STEP 46). If determining that the aircraft's estimated position is within the corridor, processor 14 advances to STEP 48 described below. If processor 14 instead determines that the aircraft's estimated position falls outside of the corridor, processor may generate a first alert signal (STEP 50). Although this alert may take any suitable form (e.g., activation of a cabin alert light or of a warning indicator light disposed on the master control display unit), the alert preferably comprises a readily-appreciable change in the color of one or more of the graphics displayed on map display 20; e.g., the RNP corridor boundary graphics (dashed lines 34) and/or the leg segment symbol (solid line 26) may change from a first color (e.g., green) to a second color (e.g., red). An example of a condition under which processor 14 would generate such an alert is illustrated in FIG. 5. After generating the first alert, processor 14 continues onward to STEP 48.

Figure 6:
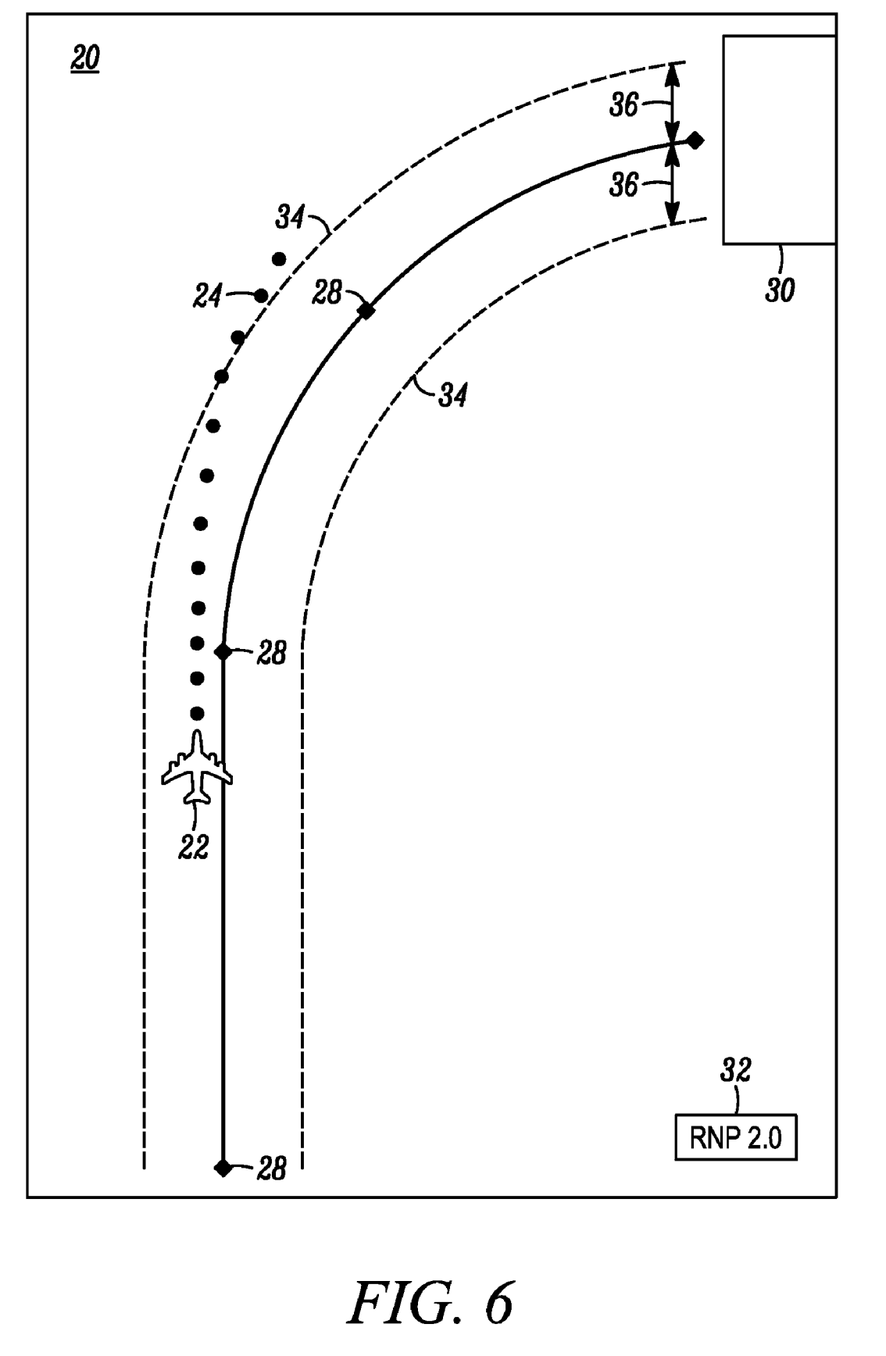

At STEP 48, processor 14 projects the aircraft flight path utilizing operational parameters (e.g., aircraft speed, bank angle, wind sheer, etc.) supplied by data sources 16 (FIG. 1) in the well-known manner. Processor 14 then compares the projected flight path to the RNP corridor (STEP 52) to determine whether the flight path breaches, or crosses over, an RNP corridor boundary. If the projected flight path does not breach an RNP corridor boundary, processor 14 returns to STEP 38 and the process repeats. If, however, processor 14 determines that the projected flight path does breach an RNP corridor boundary, processor 14 generates a second alert signal (STEP 54), which may be similar or identical to the first alert signal. For example, the second alert signal may again comprise a color change of one or more graphics displayed on map display 20; e.g., the RNP corridor boundary graphics (dashed lines 34) and/or the leg segment symbol (solid line 26) may change from the first color (e.g., green) to a third color (e.g., orange). An example of a condition under which processor 14 would generate the second alert is illustrated in FIG. 6. After generating the second alert, processor 14 returns to STEP 38 and the process repeats.

It should thus be appreciated that there has been provided an aircraft display system and method for displaying RNP corridor boundaries on a navigational map display in an intuitive manner. The above-described aircraft display system and method permits the RNP corridor to be scalable to the field of view of the map display to thereby permit the pilot (or other crew member) to view the aircraft flight plan, projected flight path, and RNP corridor in a desired level of detail. In addition, the aircraft display system and method may also be configured to generate an alert if the aircraft is currently outside of the RNP corridor or is projected to breach an RNP corridor boundary. While an exemplary embodiment of the present invention has been described above in the context of a fully functioning computer system (i.e., avionics display system 10 shown in FIG. 1), those skilled in the art will recognize that the mechanisms of the present invention are capable of being distributed as a program product (i.e., an avionics display program) and, furthermore, that the teachings of the present invention apply to the program product regardless of the particular type of computer-readable media (e.g., floppy disc, hard drive, memory card, optical disc, etc.) employed to carry-out its distribution.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for indicating the boundaries of a required navigational performance (RNP) corridor on an aircraft's map display, the method comprising:
   producing an aircraft leg segment symbol on the map display;
   establishing an RNP value;
   scaling the RNP value to the map display field of view (FOV), which is selectively changeable; and
   generating an RNP corridor boundary graphic on the map display offset from the aircraft leg segment symbol by the scaled RNP value and further adjusting the offset between the aircraft leg segment symbol and the RNP corridor boundary graphic in accordance with change in RNP value.

2. A method according to claim 1 wherein the RNP corridor boundary graphic comprises at least one line.

3. A method according to claim 2 wherein the RNP corridor boundary graphic comprises first and second dashed lines.

4. A method according to claim 1 wherein the step of establishing an RNP value comprises receiving user input designating a desired RNP value.

5. A method according to claim 1 wherein the step of establishing an RNP value comprises wirelessly receiving an assigned RNP value from an air traffic controller.

6. A method according to claim 1 further comprising:
   estimating the aircraft's position; and
   generating an alert signal if the aircraft's estimated position is outside of the RNP corridor.

7. A method according to claim 6 wherein the step of generating an alert signal comprises producing a visual alert on the map display.

8. A method according to claim 7 wherein the step of producing a visual alert comprises altering the color of the RNP corridor boundary graphic.

9. A method according to claim 1 further comprising;
   projecting the aircraft's flight path; and
   generating an alert signal if the aircraft's projected flight path breaches an RNP corridor boundary.

10. A method according to claim 9 wherein the step of generating an alert signal comprises producing a visual alert on the map display.

11. A method according to claim 10 wherein the step of producing a visual alert on the map display comprises altering the color of the RNP corridor boundary graphic.

12. A method according to claim 1 further comprising adjusting the offset between the aircraft leg segment symbol and the RNP corridor boundary graphic in accordance with a change in the map display FOV.

13. A method according to claim 1 further comprising displaying a graphic on the map display indicative of the RNP value.

14. A program product, comprising:
an avionics display program adapted to:
generate a map display having a field of view (FOV) and including a leg segment symbol;
establish an RNP value;
scale the RNP value to the map display FOV, which is selectively changeable; and
produce an RNP corridor boundary graphic on the map display separated from the leg segment symbol by the scaled RNP value and further adjust the offset between the aircraft leg segment symbol and the RNP corridor boundary graphic in accordance with change in RNP value; and computer-readable media bearing the avionics display program.

15. A program product according to claim 14 wherein the RNP corridor boundary graphic comprises at least one dashed line.

16. A program product according to claim 14 wherein avionics display program is further adapted to:
estimate the position of the aircraft; and
generate a first alert signal if the estimated position resides outside of the RNP corridor.

17. A program product according to claim 16 wherein the avionics display program is further adapted to:
project the flight path of the aircraft; and
generate a second alert signal if the projected flight path crosses over an RNP corridor boundary.

18. A program product according to claim 17 wherein at least one of the first alert signal and the second alert signal comprises an alteration in color of a graphic displayed on the map display.

19. An aircraft display system, comprising:
a monitor;
at least one data source; and
a processor coupled to the monitor and the at least one data source, the processor configured to generate on the monitor a map display including a leg segment symbol and RNP corridor boundary graphics, the RNP corridor boundary graphics separated from the leg segment symbol by a gap corresponding to an RNP value scaled to the field of view of the map display which is selectively changeable, and further adjust the gap between the aircraft leg segment symbol and the RNP corridor boundary graphic in accordance with change in the RNP value.

* * * * *